United States Patent [19]

DeCarlo et al.

[11] Patent Number: 5,251,373
[45] Date of Patent: Oct. 12, 1993

[54] METHOD FOR PROTECTION OF CABLE SPLICES

[75] Inventors: David J. DeCarlo, Toms River; Thomas L. Mineur, High Bridge; Ronald S. Stanwick, Belvidere, all of N.J.

[73] Assignee: Thomas & Betts Corporation, Bridgewater, N.J.

[21] Appl. No.: 776,139

[22] Filed: Oct. 15, 1991

[51] Int. Cl.⁵ ............................................. H01R 43/00
[52] U.S. Cl. ....................................... 29/870; 156/48; 156/49; 264/272.14
[58] Field of Search ................... 29/870, 869; 156/49, 156/48; 264/272.14

[56] References Cited

U.S. PATENT DOCUMENTS

| | | |
|---|---|---|
| 1,606,789 | 11/1926 | Hooley . |
| 2,771,502 | 11/1956 | King et al. ............................ 174/92 |
| 2,867,680 | 1/1959 | Stecher ................................ 174/92 |
| 2,881,241 | 4/1959 | Stecher ................................ 174/77 |
| 3,175,032 | 3/1965 | Strauss ................................ 174/93 |
| 3,260,794 | 7/1966 | Kohler ............................... 174/138 |
| 3,339,011 | 8/1967 | Ewers, Jr. et al. ................... 174/92 |
| 3,518,358 | 6/1970 | Brown ............................... 174/138 |
| 3,624,594 | 11/1971 | Trimble et al. . |
| 3,663,740 | 5/1972 | Dellett ............................... 174/92 |
| 3,692,926 | 9/1972 | Smith ................................ 174/92 |
| 3,796,823 | 3/1974 | Wright et al. ....................... 174/92 |
| 3,846,578 | 11/1974 | Bahder et al. ....................... 174/88 |
| 3,875,325 | 4/1975 | Anderson et al. .................... 174/92 |
| 3,897,088 | 7/1975 | Beinhaur ............................. 285/97 |
| 3,916,086 | 10/1975 | Gillemot et al. ...................... 174/93 |
| 3,935,373 | 1/1976 | Smith et al. .......................... 174/77 |
| 3,936,590 | 2/1976 | Albano ................................ 174/92 |
| 3,984,623 | 10/1976 | Worden ............................. 174/138 |
| 3,992,569 | 11/1976 | Hankins et al. ....................... 174/92 |

(List continued on next page.)

FOREIGN PATENT DOCUMENTS

| | | |
|---|---|---|
| 289981 | 5/1988 | European Pat. Off. . |
| 3025766 | 1/1982 | Fed. Rep. of Germany . |
| 58-17010 | 4/1983 | Japan ............................ 264/272.14 |
| 1-77409 | 3/1989 | Japan .................................... 156/49 |
| 334761 | 12/1958 | Switzerland . |
| 473307 | 10/1937 | United Kingdom . |
| 884786 | 12/1961 | United Kingdom . |

OTHER PUBLICATIONS

Product Application Bulletin, Western Electric Products, PAB306A, Jun. 1985, 11 sheets.
Semco, Open Sheath Plugging System for Plugging of Stalpeth, Lead Single and Double Sheath PIC Cables Installation Practice, PR-868, Aug. 1980, 13 pages.
PSI, "Peak", PSI Telecommunications, Inc. Brochure, 4 pages, 1988.
AT&T Technologies Instruction Sheet, "2200 Series Closure Installation", AT&T 633-500-112-1, Issue 2, Apr. 1985, 8 pages.

Primary Examiner—Carl J. Arbes
Attorney, Agent, or Firm—Robert M. Rodrick; Salvatore J. Abbruzzese

[57] ABSTRACT

A method for protectively enclosing electrical cables, wherein a portion of at least one cable is sealably disposed in the interior of a housing, includes the steps of placing a pressure-relief valve in communication with the housing interior, the pressure-relief valve being selected to pass an encapsulant therethrough on exposure to a predetermined pressure in said housing interior, and introducing an encapsulant under pressure into the housing interior until the encapsulant passes through the pressure-relief valve. The encapsulant introduction step is practiced by providing a pump having an inlet and an outlet, placing the pump inlet in communication with the housing interior and supplying encapsulant to the pump inlet directly from a bulk encapsulant container.

7 Claims, 11 Drawing Sheets

U.S. PATENT DOCUMENTS

| | | | |
|---|---|---|---|
| 4,015,072 | 3/1977 | Gillemot | 174/92 |
| 4,025,717 | 5/1977 | Whittingham | 174/88 |
| 4,066,486 | 1/1978 | Tan | 156/48 |
| 4,091,062 | 5/1978 | Nelson | 156/49 X |
| 4,095,044 | 6/1978 | Horsma et al. | 174/138 |
| 4,103,911 | 8/1978 | Giebel et al. | 174/21 |
| 4,117,259 | 9/1978 | Giebel et al. | 174/92 |
| 4,135,587 | 1/1979 | Diaz | 174/92 |
| 4,153,656 | 5/1979 | Bunyan | 264/40.1 |
| 4,204,896 | 5/1980 | Richardson | 156/49 |
| 4,262,167 | 4/1981 | Bossard et al. | 174/92 |
| 4,295,005 | 10/1981 | Daugherty et al. | 174/92 |
| 4,341,922 | 7/1982 | Bossard et al. | 174/92 |
| 4,346,258 | 8/1982 | Kunze | 174/93 |
| 4,347,402 | 8/1982 | Reyners | 174/91 |
| 4,350,842 | 9/1982 | Nolf | 174/92 |
| 4,421,945 | 12/1988 | Moisson | 174/92 |
| 4,424,412 | 1/1984 | Goetter et al. | 174/92 |
| 4,466,843 | 8/1984 | Shimirak | 156/48 |
| 4,477,376 | 10/1984 | Gold | 156/49 |
| 4,511,415 | 4/1985 | Dienes | 156/48 |
| 4,528,419 | 7/1985 | Charlebois et al. | 264/272.14 X |
| 4,538,021 | 8/1985 | Williamson | 174/92 |
| 4,558,174 | 12/1985 | Massey | 174/93 |
| 4,622,436 | 11/1986 | Kinnan | 174/77 |
| 4,648,919 | 3/1987 | Diaz et al. | 156/48 |
| 4,670,069 | 6/1987 | Debbaut et al. | 156/48 |
| 4,692,564 | 9/1987 | Campbell et al. | 174/92 |
| 4,692,565 | 9/1987 | Koht et al. | 174/93 |
| 4,733,019 | 3/1988 | Pichler et al. | 174/92 |
| 4,764,232 | 8/1988 | Hunter | 156/48 |
| 4,808,772 | 2/1989 | Pichler et al. | 174/92 |
| 4,818,310 | 4/1989 | McNeal | 156/48 |
| 4,875,952 | 10/1989 | Mullin et al. | 156/48 |
| 4,933,512 | 6/1970 | Nimiya et al. | 174/92 |
| 5,006,669 | 4/1991 | Bachel et al. | 174/93 |
| 5,007,701 | 4/1991 | Roberts | 350/96.20 |

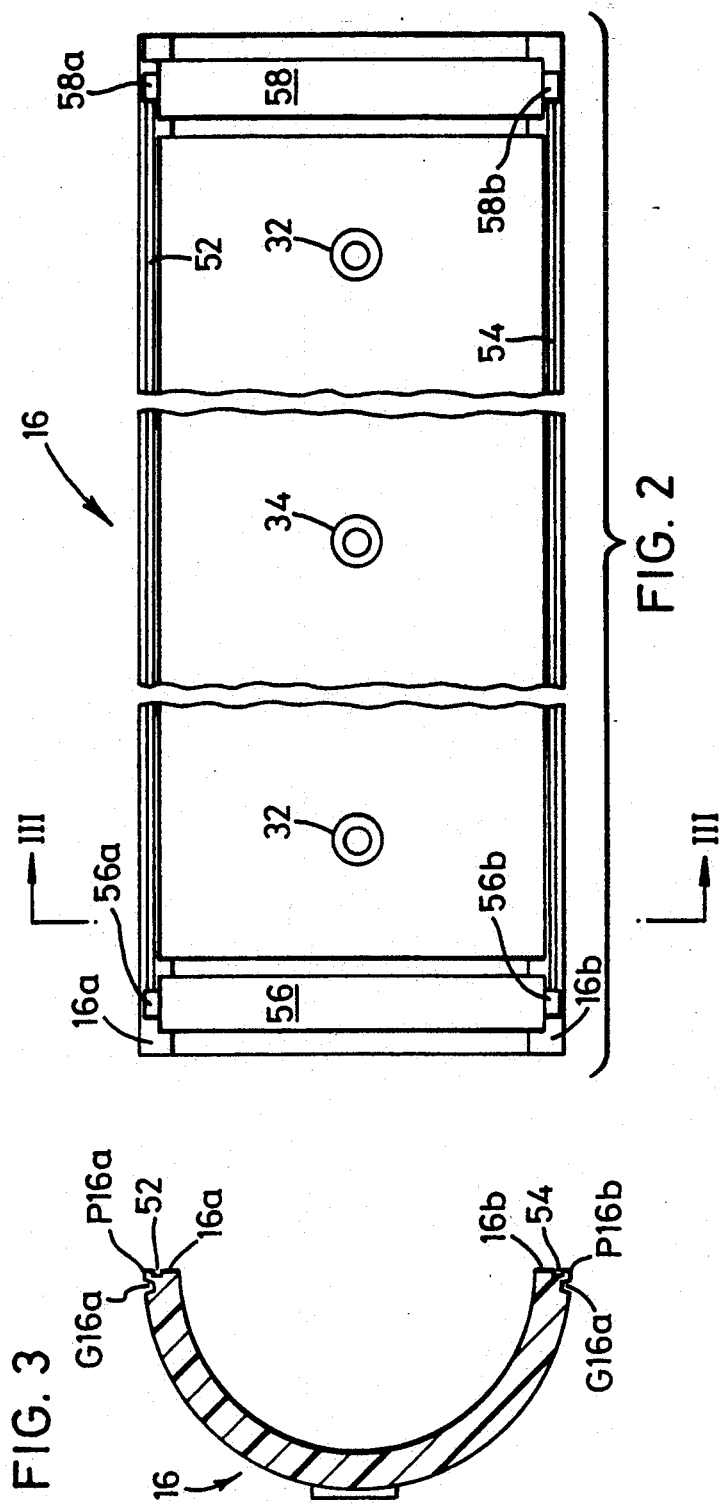

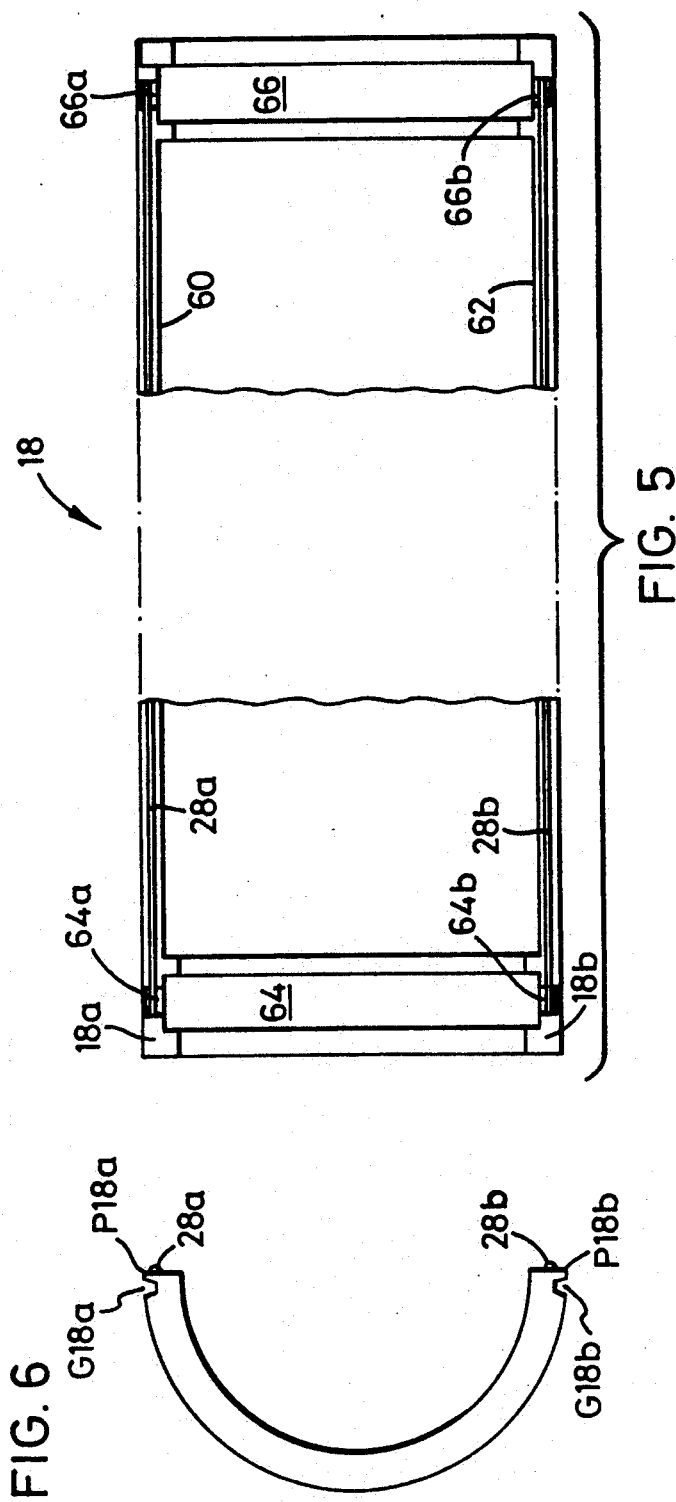
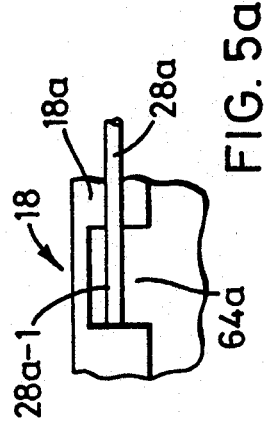

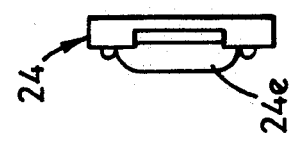
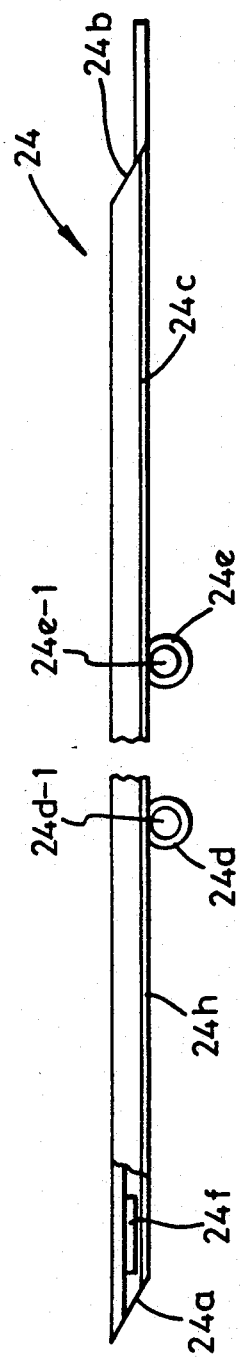
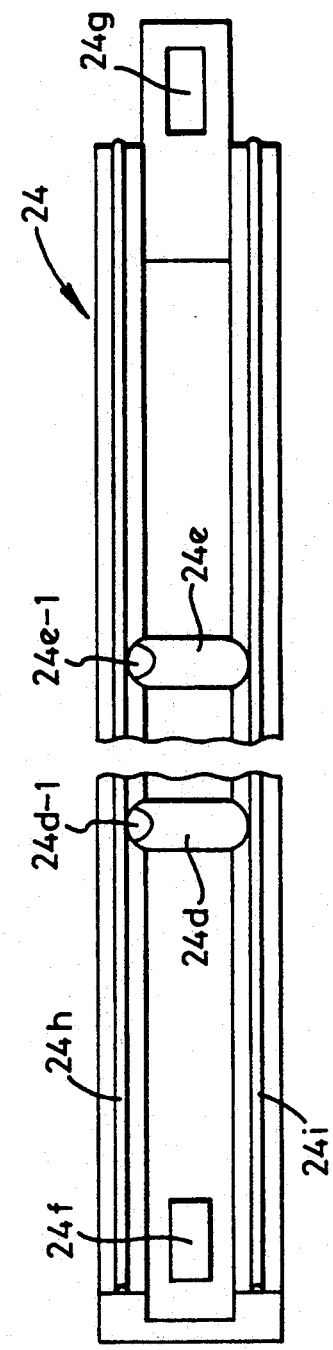

METHOD FOR PROTECTION OF CABLE SPLICES

FIELD OF THE INVENTION

This invention relates generally to protectively enclosing spliced or terminated electrical cables and pertains more particularly to methods and apparatus for improved such protective enclosure.

BACKGROUND OF THE INVENTION

Telecommunication cables are typically provided outdoors either overhead or buried in the ground. When splices to these cables must be effected, either for repair or further interconnection purposes, the spliced area (splice) must be protected against the environment. A fully protected multiple conductor cable splice often has a protective casing which may be opened for splice purposes, newly-made connections or repair of prior connections. Closure of the casing subjects the cables again to moisture intrusion. Moisture which bridges connections or exposed conductors gives rise to faults which disrupt or otherwise undermine intended communication channels, requiring costly reopening of the spliced connection, trouble-shooting and correction thereof. Moisture susceptibility is heightened where the spliced connection is located underground or in another high moisture environment.

The prior art is replete with varied approaches to a solution of the moisture intrusion problem, generally falling into three categories.

In a first type of approach, the art has looked to the application of an electrically insulative fluid to the individual conductors and connections, the fluid being of a type which "sets" or generally solidifies with the passage of time, i.e., an encapsulant. In the interval between application and setting of the fluid, mechanical force is applied thereto to induce movement of the fluid fully into the interstices between the conductors and connections. In this first approach, the mechanical force is provided by pressure-wrapping a tape member over the fluid, with successive courses of the wrapping overlapping prior courses of the wrapping and with successive longitudinal wrappings often being applied. In a variation of this first type of approach, a flexible bag is configured over the cable length to be protected with the fluid being introduced by pouring it into the bag. The open portion of the bag is then folded over the remnant thereof and the tape member is applied to the bag. In either instance, a non-rigid outer enclosure is applied to the tape wrap and sealingly secured to the cable outwardly of the splice and, at times, also to the tape wrap.

While the described practice has been successfully implemented, applicability thereof has limitations. Thus, it is not useful in installations in which the completed splice is likely to be subject to mechanical force beyond that tolerable by the non-rigid outer enclosure of the splice.

The second approach involves the steps of the first approach through the tape wrapping step. Following that juncture, however, this approach departs in providing a rigid enclosure for the splice, typically in the form of a pair of mated semi-cylindrical shells sealably secured to one another and to end plates applied to the cables prior to making the splice. In a variation of practice in the second approach, the mechanical force to displace the fluid into the splice interstices, while derived in part from the wrapping, is derived in further part by interiorly pressurizing the rigid enclosure after sealing has been effected.

The second approach, while providing an assembly suited for the environments not met by the first approach, is evidently as labor intensive in requiring the wrapping practice, and further involves the additional step of pressurization of the wrapped subassembly.

In a third approach, the art has looked to the introduction of the encapsulating fluid under pressure within a rigid enclosure. This approach omits the wrapping step following the splicing. Rigid semi-cylindrical housings are applied and are sealingly joined to one another as in the second approach. The enclosure thus formed defines an inlet port to which a caulking gun type of device containing the encapsulant fluid is connected. The enclosure further defines a closed outlet port in which is seated a pop-up type pressure indicator. In the course of a user pumping the fluid into the enclosure, by repetitively refilling the caulking gun from a bulk container of the encapsulant fluid, a point in time is reached when the pressure indicator is activated and the assembly is then considered complete.

The third approach is seen as advantageous in its provision of both a rigid enclosure and in the introduction of the encapsulating fluid under pressure, with attendant likelihood of lessening voids, e.g., entrapped air bubbles possibly receptive of moisture. However, disadvantage is seen in the use of a closed outlet while pumping fluid into the enclosure under pressure. While air may escape before the outlet is closed, some air may remain in the enclosure which may mix with the encapsulant fluid to cause air pockets or bubbles in the fluid. Further, the described practice is seen as unduly labor-intensive and time-consuming in its requirement for repetitive retreat to the bulk encapsulant container. Still further, known sealing measures and structures in the prior art in respect of this third approach are seen as less efficacious than needed for satisfaction of industry demand.

SUMMARY OF THE INVENTION

A primary object of the present invention is the provision of improved methods and apparatus for effecting the third above-discussed approach to protection of spliced electrical cables.

Another object of the invention is to lessen the labor-intensivity of the third approach to protection of spliced electrical cables as against that heretofore known.

In the efficient attainment of the foregoing objects, the invention provides a method for protectively enclosing one or more electrical cables, including the following steps. End plate means are applied to a cable, such end plate means being predefined to have a cable passage therethrough and having a cable seal in the cable passage. The end plate means are sealably applied to a housing enclosing the end plate means and defining a hollow interior. A pressure-relief valve is placed in communication with the housing interior, such pressure-relief valve being selected to pass an encapsulant therethrough on exposure to a predetermined pressure in the housing interior. An encapsulant is introduced into the housing interior until said encapsulant passes through the pressure-relief valve.

The invention has various other aspects, fully detailed below, which meet the foregoing objects of the invention. The same will be further understood from the following detailed description of the invention and from the drawings which depict the invention in its several embodiments, wherein like components and parts are identified throughout by the same reference numerals.

DESCRIPTION OF THE DRAWINGS

FIG. 2 is an underside plan view of top closure 16 of FIG. 1.

FIG. 3 is a sectional view of the top closure as would be seen from plane III—III of FIG. 2.

FIG. 4 is an enlarged partial view of the upper end portion of the top closure of FIG. 3.

FIG. 5 is a top plan view of bottom closure 18 of FIG. 1 shown with longitudinal seamers 28a and 28b secured therein.

FIG. 5(a) shows a portion of FIG. 5 on an enlarged scale.

FIG. 6 is a left side elevation of the subassembly of FIG. 5.

FIG. 13 is a front elevation of end plate assembly seal 24 of FIG. 1.

FIG. 14 is a top plan view of seal 24.

FIG. 15 is a right side elevation of seal 24.

DETAILED DESCRIPTION OF PREFERRED EMBODIMENTS AND PRACTICES

Figure 1:
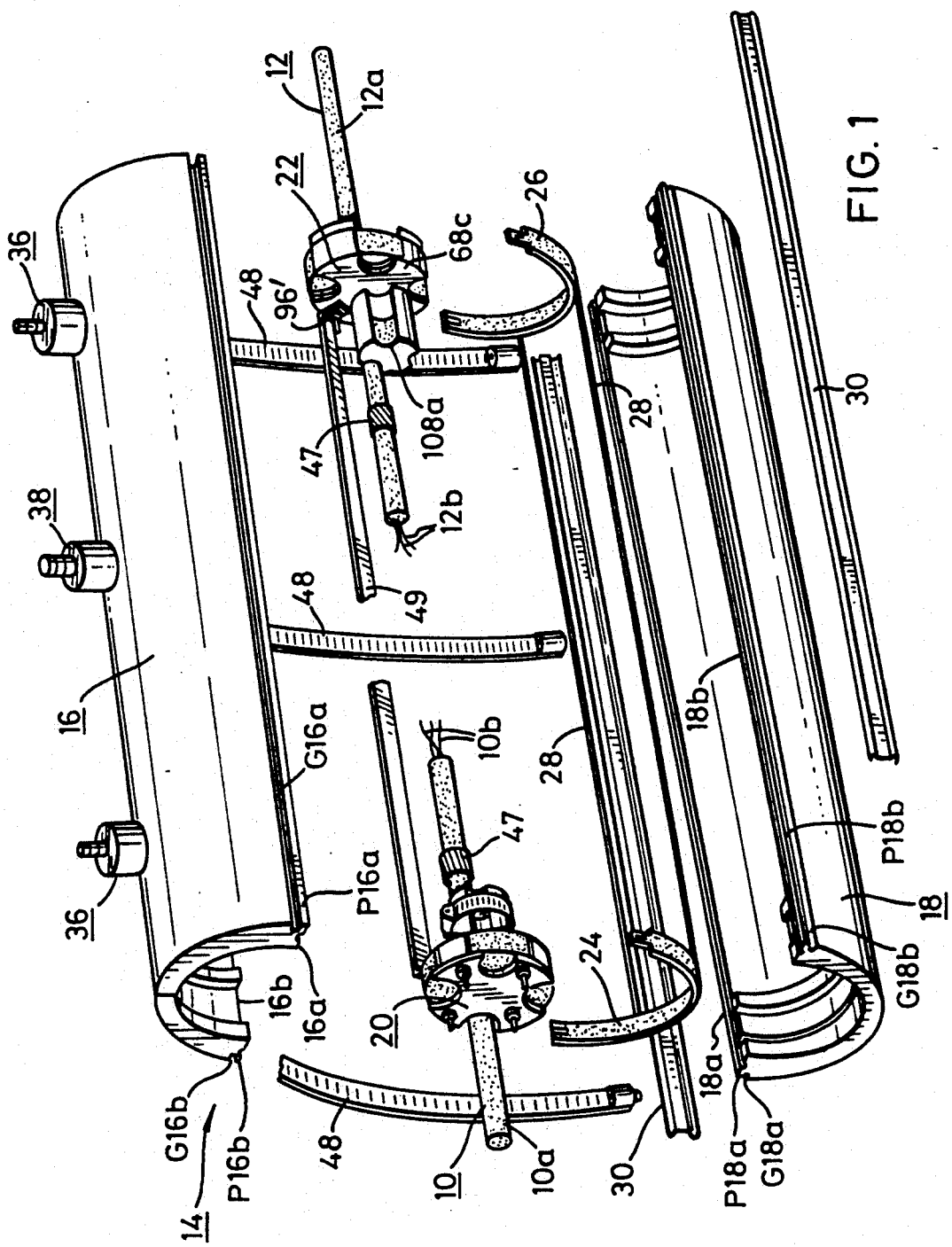
FIG. 1 is an exploded view of various components of a splice kit for implementing the invention.

Referring to FIG. 1, multiconductor cables 10 and 12 have respective insulative jackets 10a and 12a from which extend insulated conductors 10b and 12b to be spliced together. Connection of conductors 10b and 12b, although not shown, may be achieved by conventional techniques to form cable splices, taps or repairs, the term splice as used herein encompassing the joining of conductors in the same or different cables. Various components of the kit 14 of parts for use in protectively enclosing the electrical cables to be spliced together are shown in exploded manner.

First and second elongate casings, i.e., top closure 16 and bottom closure 18, are comprised of rigid plastic material. Each casing defines a hollow interior with open sides and ends. The ends are closable by end plate assemblies 20 and 22 and end plate assembly seals 24 and 26.

Closures 16 and 18 have pairs of matable longitudinally extending end surfaces, 16a, 16b and 18a, 18b as seen in FIG. 1. Longitudinal seamers 28 of generally circular cross-section are disposed between the end surfaces. Casing longitudinal grooves G16a, G16b and G18a, G18b and projections P16a, P16b and P18a, P18b cooperate with seam clamps 30 in the course of assembly, as is discussed in detail below, to sealably close the top and bottom closures.

Figure 20:
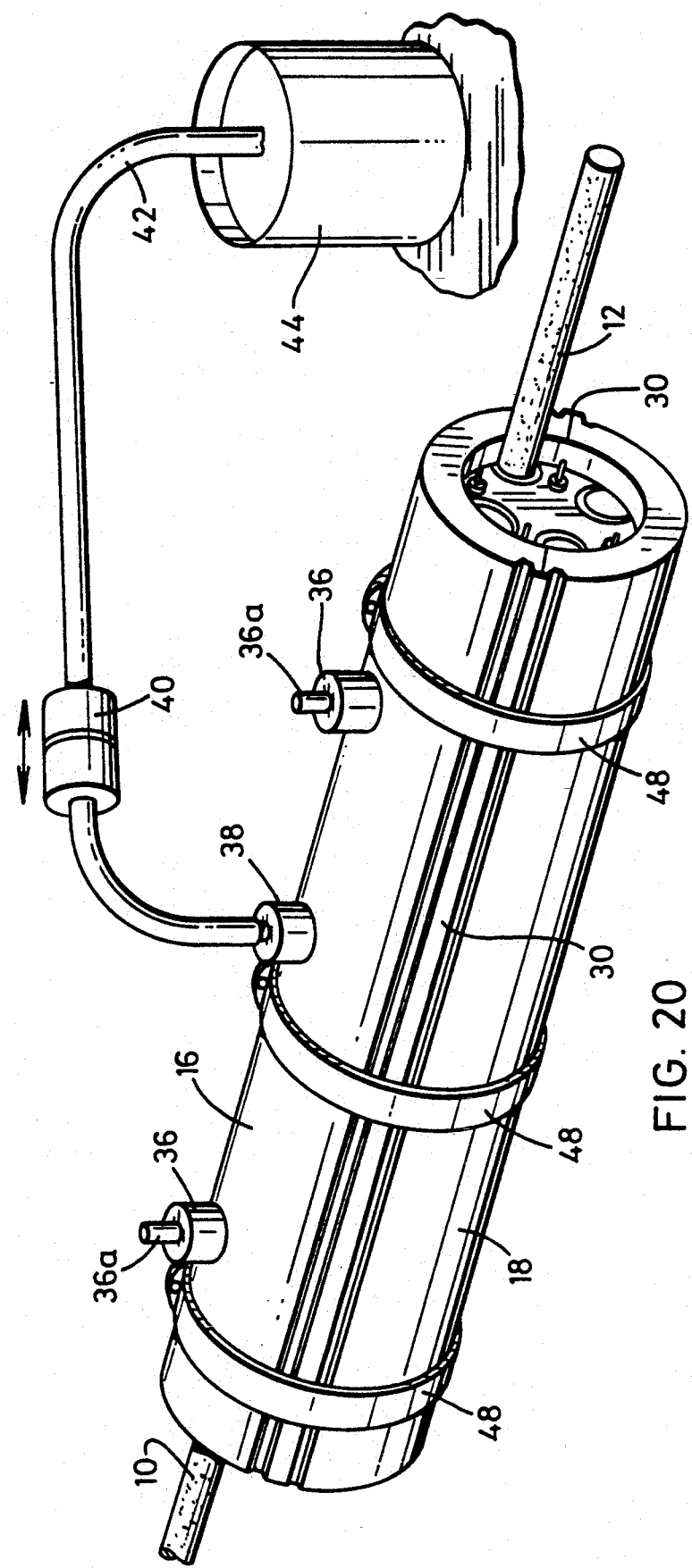
FIG. 20 is a perspective view of the splice assembly of the invention with its pressure relief valves and filler pump in place on top closure 16 and with the pump in place in a bulk container of encapsulant.

Top closure 16 is provided with suitable openings 32 and 34 (FIG. 2) for respective receipt of two pressure-relief valves 36 and a fitting 38 for a pump 40 (FIG. 20), for purposes below discussed. Pump 40 (as seen in FIG. 20) also has an intake hose 42 for disposition directly in a bulk vessel 44 containing fluid encapsulant, i.e., as purchased from a supplier. The encapsulant is a two-part compound, comprising polyurethane, but other suitable encapsulants may be used. Each valve 36 has an inlet fitting for securement in a respective opening 32 of closure 16 and an outlet port 36a adapted for issuance of encapsulant from the assembled splice. Housings for the valves 36 and fitting 38 may be directly molded into the top closure 16, with valves 36 being oriented at an angle to allow fluid escaping therefrom to drip onto the top closure upper surface.

Figure 9:
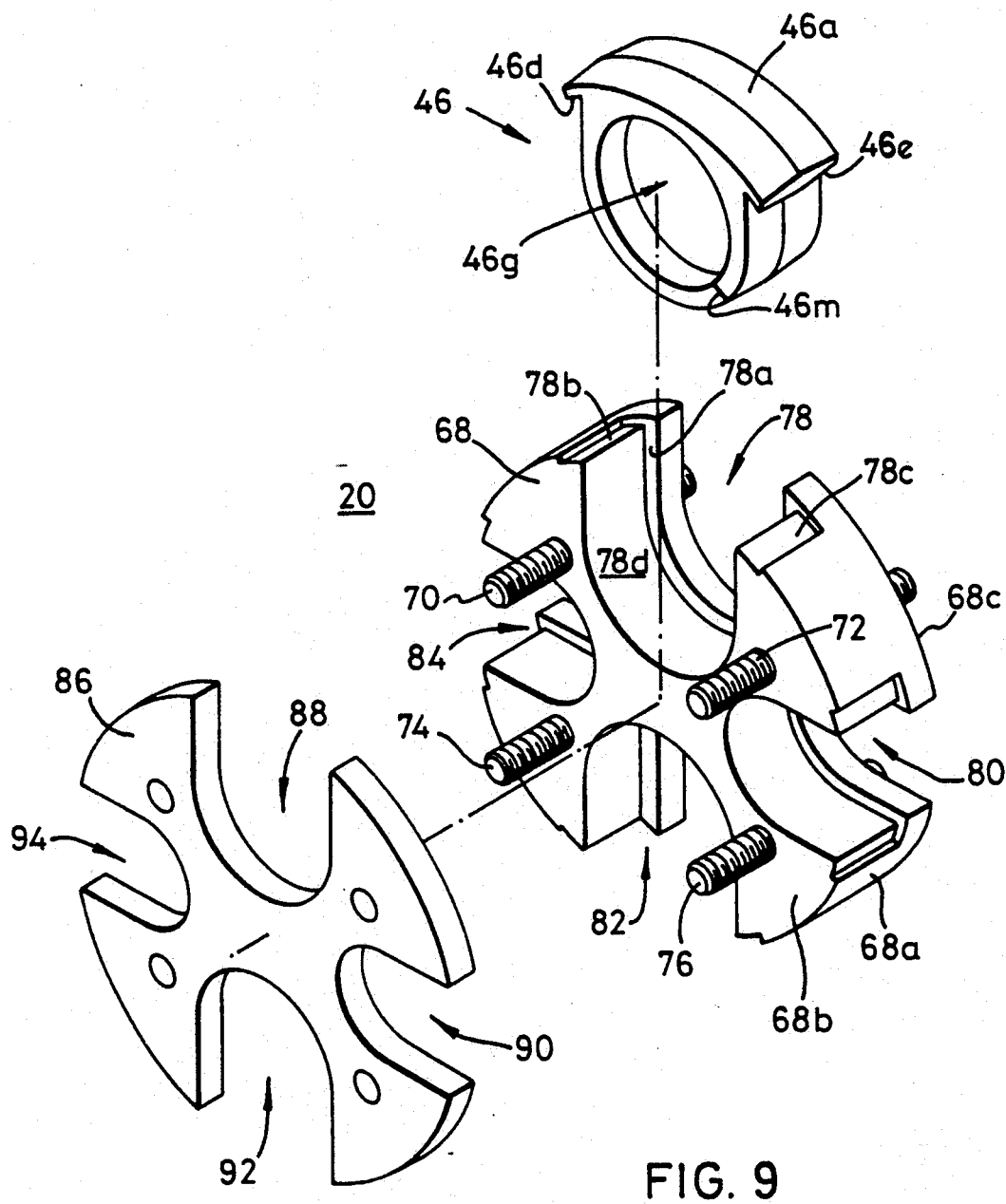
FIG. 9 is an exploded perspective view of end plate assembly 20.
Figure 11:
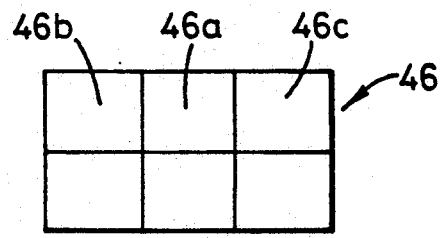
FIG. 11 is a top plan view of the cable seal of FIG. 10.
Figure 10:
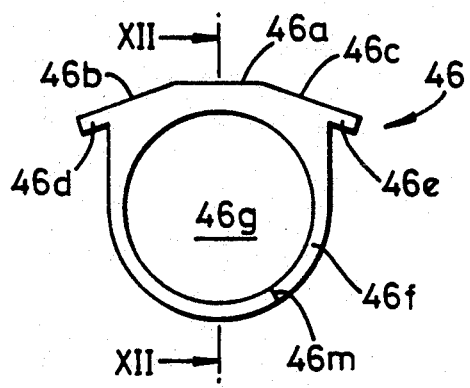
FIG. 10 is a front elevation of cable seal 46 of end plate assembly 20.
Figure 12:
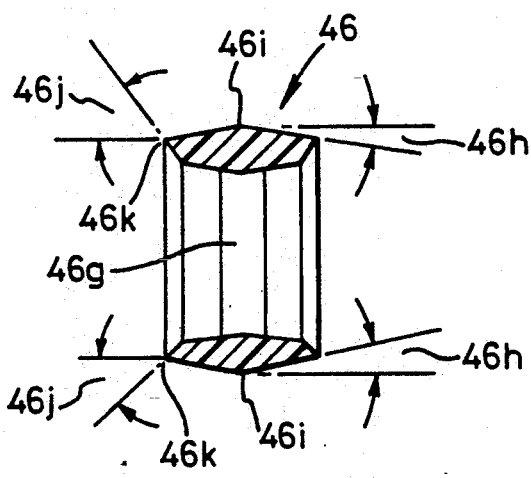
FIG. 12 is a sectional view of cable seal 46 as would be seen from plane XII—XII of FIG. 10.

At least one of the end plate assemblies 20 and 22 defines a cable passage therethrough, e.g., where a spliced or tapped cable may be brought out through the same end plate assembly 20 or 22. In the illustrated embodiment, both of the end plate assemblies have such passages, for the splicing of conductors 10b and 12b. Cable seals, e.g. seal 46 of FIG. 9, are disposed in the end plate assemblies.

By way of brief summary introduction to reaching the splice of the invention and kit 14, the method at hand involves the steps of outset preparation of the conductors to be spliced, i.e., connecting conductors and applying end plate assemblies 20 and 22 thereto, and the actual splicing, i.e., connecting the conductors with the use of conventional connectors, such as by crimping or other suitable hardware (not shown).

End plate assembly seals 24 and 26 are applied to end plate assemblies 20 and 22 to encircle them and the top and bottom closures 16, 18 are juxtaposed with the end plate assembly seals and the longitudinal seamer 28 and closed thereon. Seam clamps 30 are applied as are clamps 48, in manner fully detailed below, to reach the splice stage as shown in FIG. 20.

At this juncture, with valves 36 in place, a funnel (not shown) is inserted in opening 34 of top closure 16 before the pump fitting 38 is attached. Encapsulant is poured therein directly from container 44 to a level substantially filling the assembly. Then, the funnel is removed and fitting 38 of pump 40 is secured into opening 34 and pump inlet hose 42 is disposed in container 44, whereupon encapsulant fluid is pumped directly from container 44 into the assembly. Pump 40 may a commercially-available product, such as a hand operated, self-priming pump.

At this stage, it should be pointed out that valves 36 are conventional pressure relief valves that may be preset by the manufacturer to open to provide pressure relief at a predetermined pressure. It has been determined that for the present technique, a pressure of approximately 15 psig is sufficient to provide the desired sealing effect. However, the operating pressure range has been found to be between 12 and 18 psig, although other pressure ranges for different applications may also be considered. Accordingly, the pressure relief valves for use in the instant method are preset at a pressure of about 15 psig. Two valves 36 are used, as illustrated in FIG. 20, at both ends of the top closure 16. It is desirable to orient the relief valve at a location higher than the fitting 38 through which the encapsulant fluid is pumped into the enclosure. The use of one valve 36 at each end of the enclosure thus allows the fluid pumping to proceed with at least one of such valves 36 being higher than the fitting 38 despite enclosure orientation.

Fitting 38, which is connected to the pump hose 42, is a conventional check valve that allows fluid entry but as the pressure increases internally, the valve closes, thereby preventing backflow of fluid or air out through the valve.

In the course of the pumping of the encapsulant fluid into the enclosure under pressure, any trapped air, as well as the entering encapsulant, are compressed within the enclosure under pressure. When the pressure within the enclosure reaches 15 psig, one or both of the pressure relief valves open, thereby allowing air to initially escape. At this point, the fluid encapsulant from container 44 is continued to be introduced under pressure by pumping. Following the release of air through the valves 36, encapsulant sporadically escapes from one or both valves 36 until a steady stream of encapsulant flows from the valves. At this point, i.e. at 15 psig, the encapsulant is considered sufficiently pressurized to be forced around the cables, into the interstices between the cables, and around any connections in the splice. This thus creates a barrier against water migration throughout the interstices along the cable conductors. Once the steady flow of encapsulant is achieved, the splice enclosure is considered fully encapsulated and no air is present. Pumping of the encapsulant is then stopped, and the tube 42 is either severed or disconnected from the fitting 38. When the pumping is terminated, the flow of encapsulant from the valves 36 will likewise cease. Since the valves 36, as well as the fitting 38 are closed, the pressure will be maintained at approximately 15 psig over at least a period of time, e.g. two hours, which would allow the fluid encapsulant sufficient time to properly cure or set in order to establish the moisture barrier.

The described embodiment is thus to be seen as involving the third approach, above discussed, and enjoys the advantages thereof, i.e., deriving mechanical force for directing the encapsulant into the splice interstices and having sufficient housing rigidity for widespread application. Various structural distinctions, however, apply particularly in respect of improved sealing structures and practices as will be seen from the following more detailed discussion thereof.

Turning to FIGS. 2–4, top closure 16 has semicylindrical shape with a hollow interior with which openings 32 and 34 communicate. Longitudinal grooves G16a and G16b and projections P16a and P16b are seen in FIG. 3. In the enlarged partial view of FIG. 4, groove G16a, typical of all four grooves, has angled sidewalls G16a-1 and G16a-2. Seamer-receiving recesses 52 and 54 are of generally rectangular configuration and open into end surfaces 16a and 16b, respectively. Pockets 56 and 58 are provided for the receipt of upper halves of end plate assemblies 20 and 22 of FIG. 1 and, more particularly, for engaging end plate assembly seals 24 and 26 encirclingly applied to assemblies 20 and 22. The pockets have end portions 56a, 56b and 58a, 58b which communicate with recesses 52 and 54, for purposes below discussed.

Referring to FIGS. 5 and 6, bottom closure 18 has longitudinal grooves G18a and G18b and projections P18a and P18b, the grooves having the same angled sidewall configuration as above discussed and shown in FIG. 4. Seamer-receiving recesses 60 and 62, similar to recesses 52 and 54, are of general rectangular configuration and open into end surfaces 18a and 18b. Seamers 28a and 28b are shown in place, being secured in the seamer-receiving recesses 60 and 62 (hidden thereby and hence not seen) by a suitable adhesive. Pockets 64 and 66 are provided for the receipt of lower halves of end plate assemblies 20 and 22 and end plate seals 24 and 26 encirclingly applied thereto. The pockets have end portions 64a, 64b, and 66a, 66b which communicate with recesses 60 and 62, also for purposes below discussed. Referring to FIG. 5(a), it will be seen that the seamers are of length to extend outwardly of their recesses to end extents which may, as is shown for seamer 28a end portion 28a-1, be situated in pocket end portion 64a.

Figure 8:
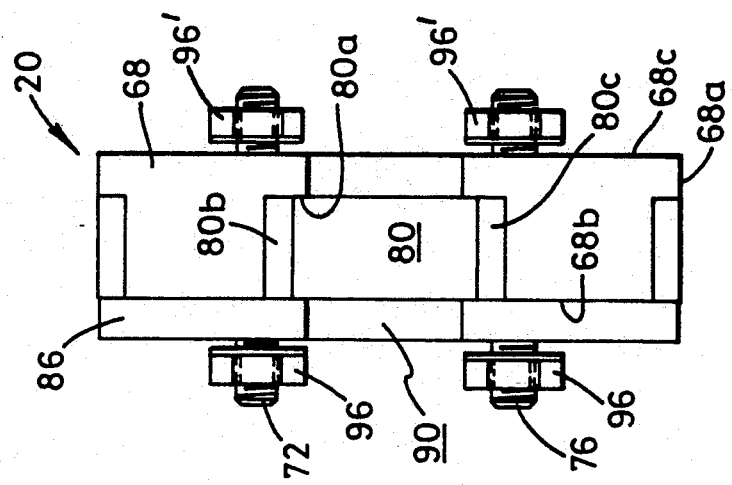
FIG. 8 is a right side elevation of FIG. 7.
Figure 7:
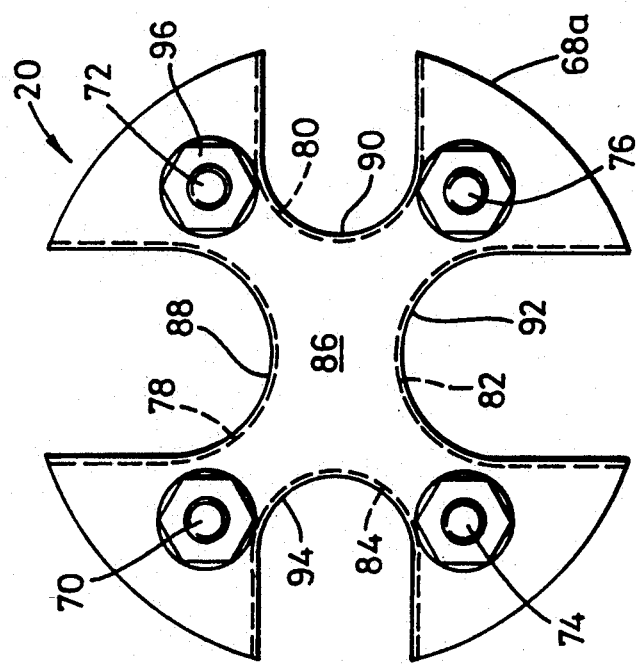
FIG. 7 is a front elevation of end plate assembly 20 of FIG. 1.

FIGS. 7 through 9 show end plate assembly 20 to include a base plate 68 having a circular outer surface 68a, a front wall 68b and a rear wall 68c. Threaded bolts 70, 72, 74 and 76 are secured through the base plate and project outwardly from both front wall 68b and rear wall 68c, the base plate preferably being formed by molding plastic material in situ about the bolts. The base plate defines cable seal-receiving recesses 78, 80, 82 and 84 of generally U-shaped configuration. A cover plate 86, having recesses 88, 90, 92 and 94 also of generally U-shaped configuration for registry with base plate recesses 78–84, is applied to the base plate bolts. Nuts, as indicated typically at 96, are threaded onto the bolts. Nuts 96' are provided for the bolt portions projecting from the rear walls 68c, for purposes as will be described. Recesses 88–94 are of lesser size than recesses 78–84 (shown in phantom in FIG. 7), such that expanses of cover plate 86 engage seals 46 resident in recesses 78–84, for purposes below noted.

As is seen in the perspective view of FIG. 9, each of recesses 78–82 includes a partial internal wall 78a and top ledges 78b and 78c, as noted for recess 78. Seal seating surface 78d extends below and forwardly of internal wall 78a and is continuous with ledges 78b and 78c and of like depth, i.e., less than the thickness of base plate 68.

Cable seals 46 are each comprised of a resilient material, e.g., thermoplastic rubber, or other suitable elastomeric material, and are configured as is indicated in FIGS. 9 through 12. The seal top surface is centrally arcuate as at 46a and downwardly inclined portions extend from portion 46a as at 46b and 46c, defining outward ears 46d and 46e. The depending or main body portion 46f of the seal is configured compatibly with the recesses of base plate 68 and defines a central portion which may be removed or pre-formed to define opening 46g for passage of a cable therethrough. The seal 46 is preferably formed to have surfaces arranged at angles 46h defining peaks 46i at the top and bottom thereof. Also, the sides of the seal may be formed at angles 46j defining relatively pointed edges 46k. The peaks 46i and edges 46k serve as high concentration points for enhanced sealing. The body portion 46f of the seal 46 is further preferably formed to have a slit 46m extending through the wall and communicating with the opening 46g to receive a cable transversely therethrough for residence in the opening 46g. Alternatively, the body portion may be provided with an indicia in the form of a mark or groove, for example, for subsequently indicating the location of the slit 46m to be formed.

Seals 46 are so preformed or configured that on residence thereof in the base plate recesses, the seal main body portion engages seating surface 78d and internal wall 78a and ears 46d and 46e nest on ledges 78b and 78c, but portions of the seals extend radially outwardly of outer surface 68a and axially forwardly of front wall 68b of base plate 68.

Turning now to FIGS. 13-15, end plate assembly seal 24 is an elongate member of flexible material, such as rubber, or other suitable elastomeric material, having oppositely tapered ends 24a and 24b which are adapted to mutually nest on application of the seal to end plate assembly 20 of FIG. 1. On its outward surface 24c, seal 24 includes protruding sleeves 24d and 24e, having respective channels 24d-1 and 24e-1 opening thereinto. At its opposed ends, seal 24 has a locking member 24f and a receptor 24g in the form of an opening for the locking member, the interfitting of the locking member in the receptor providing securement of seal 24 about the periphery of end plate assembly 20. Sealing ribs 24h and 24i extend longitudinally along the surface 24c of seal 24.

Figure 16:
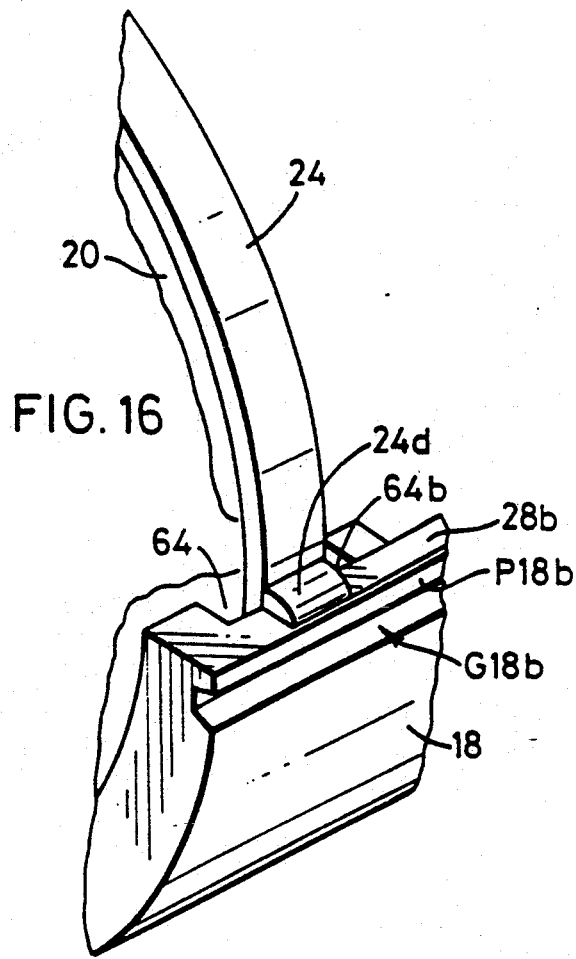
FIG. 16 is an enlarged partial perspective view showing seal 24 nested in bottom closure 18 and in receipt of seamer 28b.

The perspective partial view of FIG. 16 depicts the disposition of seal 24 within bottom closure 18. As is seen therein, protruding sleeve 24d is situated in pocket end portion 64b of closure 18 and seal 24 is otherwise disposed in pocket 64, with the end extent of longitudinal seamer 28b adhesively secured in protruding sleeve 24d. In a preferred arrangement, the assembly seals 24 and 26, together with both longitudinal seamers 28a and 28b, are formed integrally as a one-piece, molded member adhesively attached to the lower closure 18 in a pre-assembly.

Figure 18:
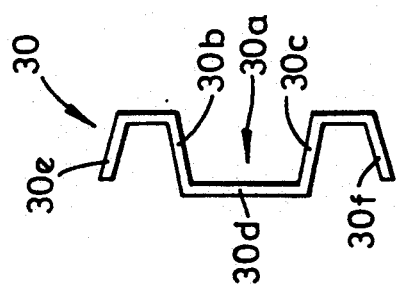
FIG. 18 is a right side elevation of FIG. 17.
Figure 17:
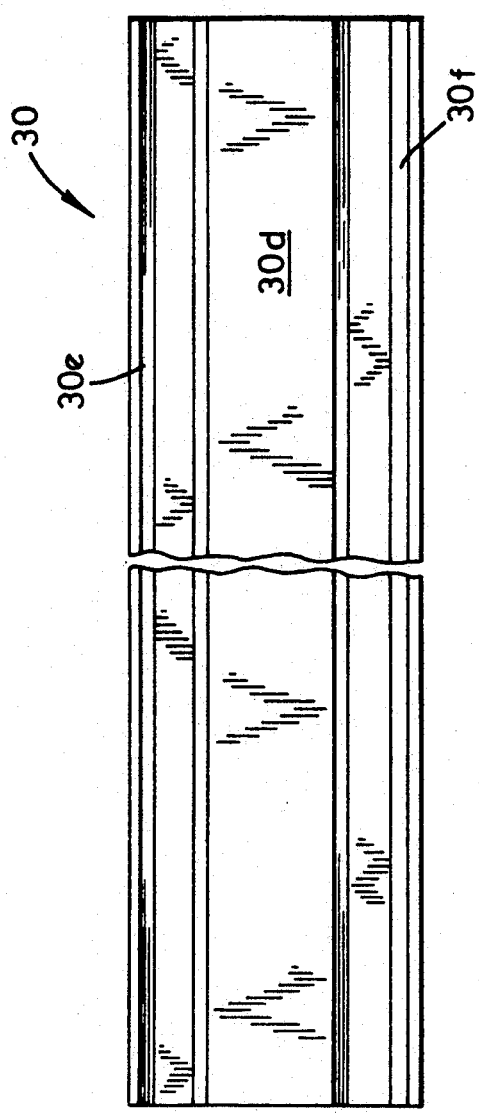
FIG. 17 is an elevation of seam clamp 30 of FIG. 1 as would be seen from the interior thereof as it would applied to closures 16 and 18.

Turning to FIGS. 17 and 18, longitudinal seam clamp 30 is a rigid member, preferably constituted of metal, and defines a channel 30a formed by inclined legs 30b and 30c projecting from a central interior flat section 30d. Legs 30b and 30c are configured compatibly with projections, P16a, P16b and P18a P18b, above discussed, for nesting of the projections in the channel 30a. End wings 30e and 30f are likewise configured compatibly with grooves G16a, G16b and G18a, G18b, also above discussed, for residence therein.

Figure 19:
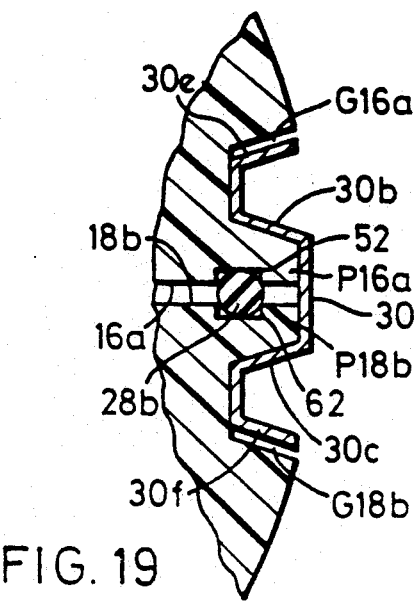
FIG. 19 is a partial sectional view of the assembly of clamp 30 with the top and bottom closures and seamer 28b.

FIG. 19 is illustrative of a partial section (material sectioning being omitted) of a splice enclosure in accordance with the invention. Top closure 16 and bottom closure 18 have their matable end surfaces 16a and 18b in juxtaposition. Longitudinal seamer-receiving recess 52 of top closure 16 and the counterpart seamer-receiving recess 62 of bottom closure 18 will bear on seamer 28b, which will also be seen to be preferably a solid rubber cylinder. Legs 30b and 30c of seam clamp 30 are resident respectively in grooves G16a and G18b and bear upon its angled sidewalls that, together with inclined legs 30b and 30c, squeeze the top closure 16 and the bottom closure 18 tightly on seamer 28b.

Thus, the method of the present invention involves the following steps. Cable seals 46 are selected such that openings 46g are compatibly sized with the diameter of cables 10 and 12. Seals 46 may be formed without existing cable passages, but with diverse diameter circular indications on a full central panel thereof. The seal central panel is then cut as desired to define the desired cable passage of size to receive the cable in frictional fit. Cables 10 and 12 are now inserted into the cable seal openings 46g. To compensate for any unevenness of the slit 46m in the seal body portion, a small section of butyl-type tape may be placed in the slit 46m after the cable is inserted. A sealant (see FIG. 1) in the form of pliable tape, such as a butyl-type tape is applied around cable jackets 10a and 12a. This sealant 47 provides compensation for imperfect cable jacket surfaces, which may be out of round or have some minor surface imperfections. The seals 46 are drawn up against respective sealants 47. The seals are inserted into end plate assemblies 20 and 22, which have cable seals without cable passages inserted into all cable receiving recesses not passing cables therethrough. The combination of the friction fit of opening 46g on the cable, together with the sealant thereagainst, effectively seals each cable to a seal 46.

Subsequent to the end plate assemblies 20 and 22, being joined to the cables, a bond bar 49 (FIG. 1) is secured to the end plate assemblies 20 and 22. The bond bar 49 is formed of conductive material, preferably metal, and is formed to have a predetermined length. The longitudinal end portions of the bond bar 49 end are formed to have an opening for receipt of any one of the bolts 70, 72, 74 or 76, projecting from the rear wall 68c of each end plate. A threaded nut 96' secures the end portion of each bond bar 49 to a respective end plate assembly 20 and 22 as depicted in FIG. 1. Thus, a set axial dimension is established by the predetermined length of the bond bar 49 between the end plates 20 and 22 for proper location in the top and bottom closures 16 and 18. Further, the bond bar 49 establishes a through-ground connection within the splice which may be connected externally by any one of the bolts 70-76 to which the bar 49 is connected, inasmuch as the bolts 70-76 extend outwardly of the end plate assemblies 20 and 22. Further, the bond bar 49 may be connected within the splice enclosure to cable shielding by suitable hardware.

Seals 24 and 26 have been preferably disposed in preassembly in the pockets 64 and 66 in the lower closure 18, with the seamers 28a and 28b being located in the longitudinal recesses 60 and 62. The end plate assemblies 20 and 22 thus reached are nested on the seals 24 and 26 in pockets 64 and 66. The seals 24 and 26 are then locked on the end plate assemblies 20 and 22 by inserting locking members 24f in receptors 24g.

Top closure 16 is now mated with bottom closure 18 nesting the upper recesses 52 and 54 on seamers 28a and 28b supported by bottom closure 18. Seam clamps 30 are now applied to the assembly as above discussed and shown in FIG. 19. Pockets 56 and 58 receive the upper halves of end plate assemblies 20 and 22 with the locked seals 24 and 26 circumferentially thereon.

Clamps 48 (FIG. 20) which are preferably metal band clamps with a locking screw are now applied about the joined top and bottom closures and tightened. In the course of tightening of the clamps, various seals are enhanced. Top and bottom closures 16 and 18 are forced into tight, moisture-resistant engagement with longitudinal seamers 28a and 28b. The walls of pockets 56 and 64 and of pockets 58 and 66 bear down respectively on the seals 24 and 26 on the end plate assemblies 20 and 22 providing tight, moisture-resistant circumferential engagement between such walls and seals 24 and 26 and between seals 24 and 26 and the circumference of the end plate assemblies 20 and 22. Further, the ears 46d and 46e of cable seals 46 are forced radially inwardly, with resulting tight, moisture-resistant engagement with the end plate ledgers 78b and 78c.

As will be recalled, cable seals 46 are configured to extend axially outwardly of the front wall 68b of base plate 68 and recesses 88-94 are so dimensioned that cover plate 86 has expanses confronting the cable seals. A further step in the assembly is to now tighten nuts 96 onto bolts 70-76 of each of end plate assemblies 20 and 22. This results in a forcing of cover plates 86 toward base plates 68 commonly compressing the cable seals 46 such that the bodies 46f of the seals are forced against the internal walls 78a. Thus, sealing is effected between the cable seals 46 and the internal wall 78a and also between the cable seals 46 and the cover plate 86 along the periphery of the front wall 68b adjacent the U-shaped surface 78d. Sealing of the cables to the seals, as described hereinabove, is effected by the frictional force of the cable opening 46g and the sealant 47 pressed thereagainst. Although some sealing may occur between the seal body portion 46f and the seating surface 78d under the influence of the clamps 48, this is considered insufficient for this application, the effective seal of the seal body portions to the base plate 68 occurring under the influence of the axial movement of the cover plate 86 thereagainst.

The described protective closure is readied for the outset funnel introduction of encapsulant and subsequent pressurized introduction of encapsulant through fitting 38 by pump 40, as in FIG. 20.

Figure 20A:
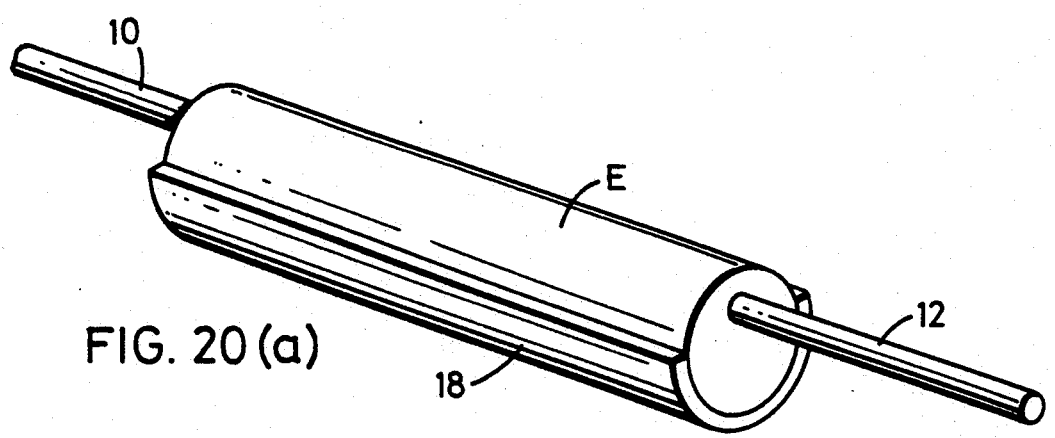
FIG. 20(a) is a perspective view, for purposes of explanation, in which the top closure and clamps 48 are omitted to depict the interior contents of the splice assembly of FIG. 20 on its completion.

In FIG. 20(a), a perspective view is seen of the finalized splice assembly of the invention with components other than bottom closure 18 removed for purposes of illustration of the set, pressurized encapsulant E having shape conformity with the interior of closure 16, i.e., fully semi-cylindrical with cables 10 and 12 embedded therein and protected against moisture intrusion.

Figure 23:
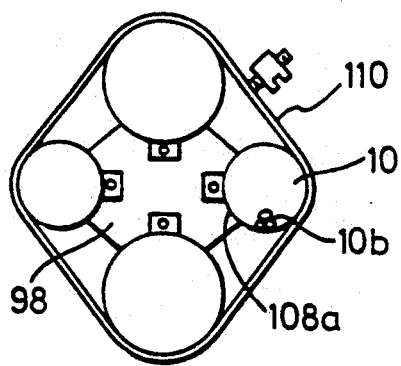
FIG. 23 is an elevation view from inside the closures 16 and 18 looking toward end plate assembly 20 to show particular details of the cable strain relief.
Figure 21:
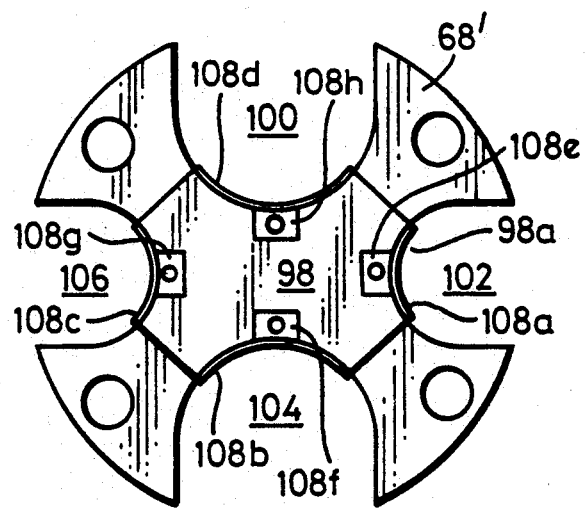
FIG. 21 is a front elevation of a modified form of an end cover plate for strain relief usage.
Figure 22:
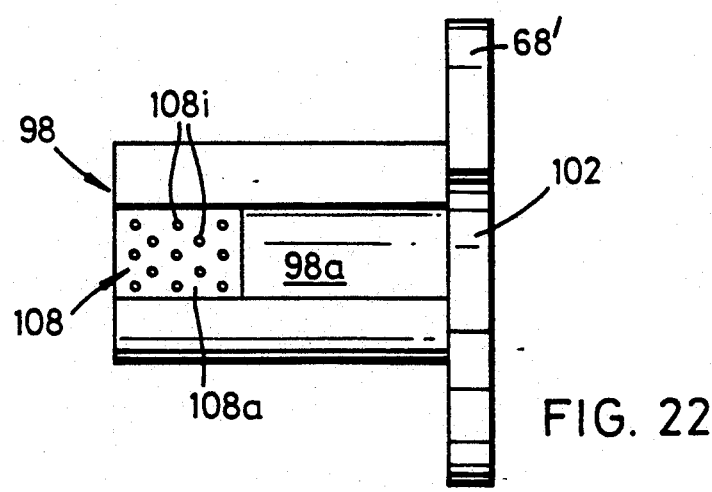
FIG. 22 is right side elevation of FIG. 21 with a strain relief member assembled with the end cover plate thereof.

Turning to FIGS. 21-23, a further version of base plate 68 is indicated as 68'. Cable support 98 extends outwardly of base plate 68' and is preferably formed integral with the base plate, i.e., is molded therewith. Support 98 has four cable rests, one being shown at 98a, each in the form of a semicylindrical depression in support 98 and in registry with recesses 100, 102, 104 and 106.

A strain-relief member 108 comprises four arcuate portions 108a-d which nest respectively in the cable rests 98a of support 98. Each arcuate member 108a-d is suitably secured to the support 98, for example, by a tab 108e-h which, for example, may be attached to the support 98 by screws or rivets. The arcuate portions have teeth 108i struck outwardly thereof to penetrate the insulation of cable jackets passing through base plate 68' under the influence of a clamp 110 as shown in FIG. 23 applied circumscribingly to support 98 with one or more cables in place.

Advantage attending the use of the structure of FIGS. 21-23 is principally in displacing the location at which cables will bend under abuse distal from the location at which the cables exit the cable seals. Secondary benefit is the resistance to longitudinal movement of the cables relative to the cable seals, i.e., longitudinal strain-relief.

While the support 98 may be located outwardly of the splice enclosure, the preferred arrangement of the invention contemplates the provision of such support extending from the base plates 68' inwardly into the splice enclosure, and thus also encapsulated, to provide for enhanced longitudinal strain relief within the splice assembly.

Various modifications to the particularly illustrated splice and sealing structure of the invention may evidently be introduced without departing from the invention. By way of example, it will be appreciated that the sealing structure has utility also in the second above-noted approach to splice protection. Thus, it is to be understood that the specifically disclosed and depicted embodiments are intended in an illustrative and not in a limiting sense. The true scope of the invention is set forth in the following claims.

What is claimed is:

1. In a method for protectively enclosing one or more electrical cables, the steps of:
   A. applying end plate means to a cable, said end plate means being predefined to have a cable passage therethrough and having a cable seal in said cable passage;
   B. sealably applying to said end plate means a housing enclosing said end plate means and defining a hollow interior;
   C. placing a pressure-relief valve in communication with said housing interior, said pressure-relief valve being selected to pass an encapsulant therethrough on exposure to a predetermined pressure in said housing interior; and
   D. introducing an encapsulant under pressure into said housing interior until said encapsulant passes through said pressure-relief valve.

2. The invention claimed in claim 1, wherein said step B is practiced in part by providing first and second elongate casings juxtaposable along respective end surfaces thereof and sealably mating said first and second casings at said end surfaces.

3. The invention claimed in claim 1, wherein said step D is practiced in part by providing a pump having an inlet and an outlet, placing said pump outlet in communication with said housing interior and supplying encapsulant to said pump inlet.

4. The invention claimed in claim 2, wherein said step B is further practiced by configuring said end plate means with a recess and inserting said cable sea-1 in said recess.

5. In a method for protectively enclosing one or more electrical cables wherein a portion of at least one cable is sealably disposed in the interior of a housing, the steps of:
   A. placing a pressure-relief valve in communication with said housing interior, said pressure-relief valve being selected to pass an encapsulant therethrough on exposure to a predetermined pressure in said housing interior; and B. introducing an encapsulant under pressure into said housing interior until said encapsulant passes through said pressure-relief valve.

6. The invention claimed in claim 5, wherein said step B is practiced by providing a pump having an inlet and an outlet, placing said pump inlet in communication with said housing interior and supplying encapsulant to said pump inlet.

7. In a method for protectively enclosing one or more electrical cables wherein a portion of at least one cable is sealably disposed in the interior of a housing, the steps of:

A. providing a pump having an inlet and an outlet and placing said pump outlet in communication with said housing interior;

B. providing a bulk container of encapsulant; and

C. supplying encapsulant to said pump inlet directly from said bulk encapsulant container.

* * * * *